United States Patent Office 3,260,457

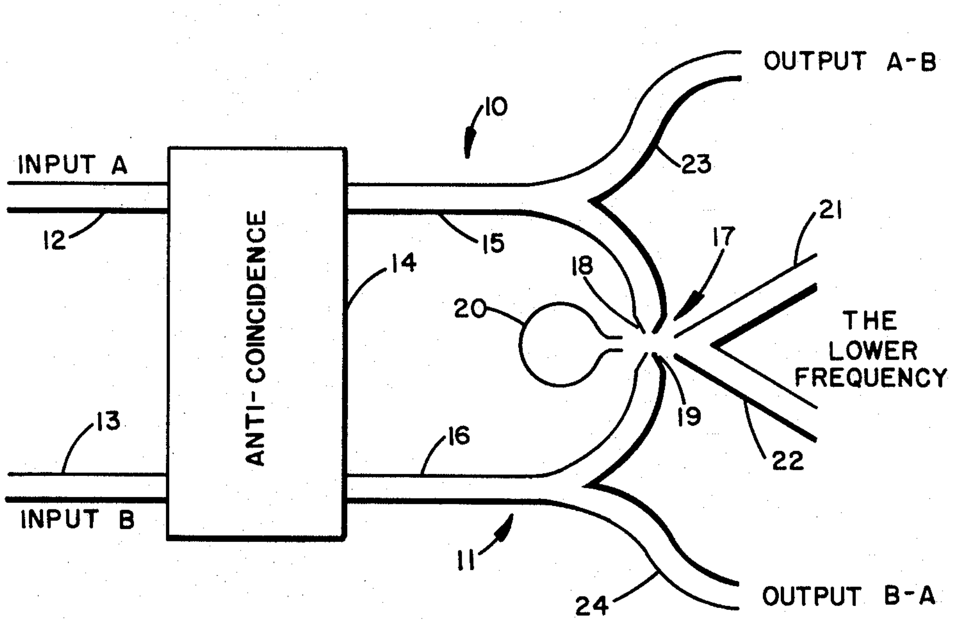
FIGURE I
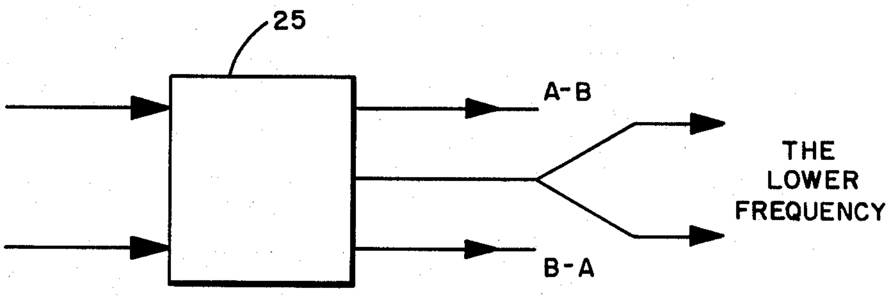
FIGURE II
INVENTOR.
CAVAS M. GOBHAI
EDWARD SCHOPPE, JR.
BY Lawrence H. Patton
AGENT July 12, 1966 C. M. GOBHAI ETAL 3,260,457
FLUID LOGIC PULSE FREQUENCY SUBTRACTOR
Filed June 24, 1964 2 Sheets-Sheet 2
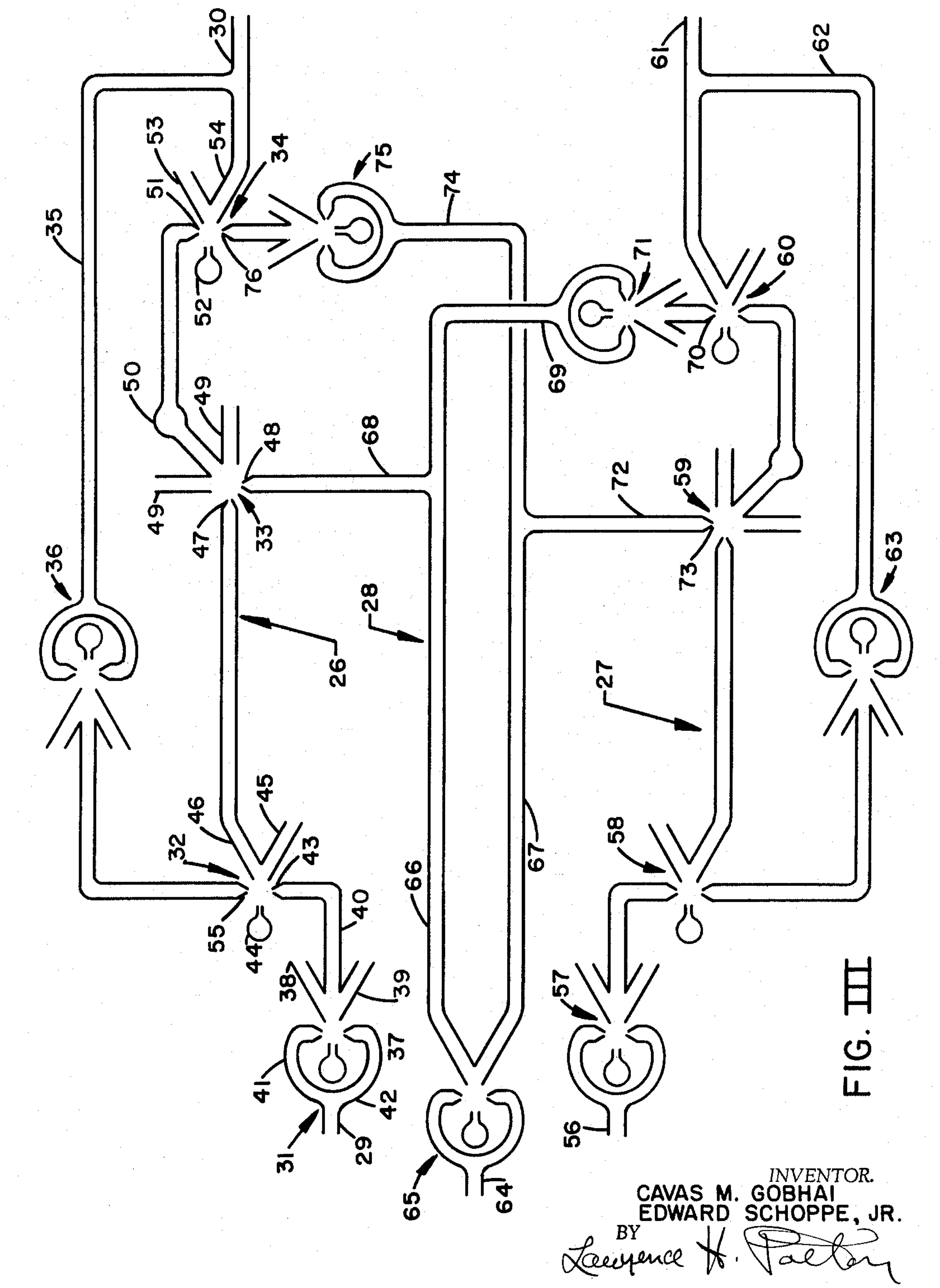
FIG. III
INVENTOR.
CAVAS M. GOBHAI
EDWARD SCHOPPE, JR.
BY Lawrence H. Patton
AGENT

Patented July 12, 1966

3,260,457

FLUID LOGIC PULSE FREQUENCY SUBTRACTOR

Cavas M. Gobhai, Cambridge, and Edward Schoppe, Jr., Walpole, Mass., assignors to The Foxboro Company, Foxboro, Mass., a corporation of Massachusetts Filed June 24, 1964, Ser. No. 377,662
2 Claims. (Cl. 235—201)

This invention relates to fluid logic arithmetic devices on a binary basis of function with fluid logic units which are compact and have no moving parts.

This invention involves the treatment of pulse trains and, in particular, a device for producing a single pulse output from two consecutive input pulses when there is no interference from other pulses.

A particular application of this invention is to subtraction of the pulse frequency of one pulse train from that of another.

This is a dynamic fluid device on a continuous flow basis.

In the illustrative embodiment of this invention presented herein, two pulse trains are applied to the device. The one of less frequency is subtracted from the other, regardless in which part of the system the greater pulse train appears. If the frequency rate changes in either pulse train so that the one that is the greater now becomes the lesser, then the subtraction is automatically reversed and the now lesser frequency is subtracted from the now greater frequency.

This invention therefore provides a new and improved fluid logic arithmetic device.

Other objects and advantages of this invention will be in part apparent and in part pointed out hereinafter and in the accompanying drawings, wherein:

FIGURE I is a schematic illustration of a pulse frequency subtractor device in accordance with this invention;

FIGURE II is a block diagram illustration of the function of the system of FIGURE I; and FIGURE III is a schematic illustration of an anti-coincidence circuit used as an introduction part of this system as illustrated in FIGURE I.

In the FIGURE I illustration, this device is provided with one pulse system A, indicated generally at 10, and a second pulse system B, indicated generally at 11. Each of these systems is provided for the purpose of carrying a pulse frequency train from the left to the right in the drawing, with the system 10 having an input at 12 and system 11 having an input at 13.

The two separate pulse train inputs are applied to an anti-coincidence circuit 14, which is illustrated in, and will be described in connection with FIGURE III. It is important that there be no coincidence between any one pulse in the train system 10 and any one pulse in the train of system 11.

Accordingly, the output of the anti-coincidence circuit 14 is a pulse train A, in the system 10, and a pulse train B, in the system 11, with no coincidence between any of these pulses.

The anti-coincidence output in system 10 is indicated at 15, and in system 11 at 16. The passages 15 and 16 both lead respectively to a flip-flop unit 17, as control inputs 18 and 19 respectively therefor.

The flip-flop unit 17 is provided with a power source 20, and two outputs 21 and 22, such that application thereto of a pulse from system 10 will provide a flip-flop output in the passage 22 and application of a pulse from system 11 will provide a flip-flop output in the output passage 21.

Each of the pulse train systems 10 and 11 has a branch passage leading away from the anti-coincidence circuit output passages 15 and 16, as indicated at 23 and 24 respectively. These are output passages. With the pulse train of system 10, indicated at A, the output passage 23 provides a subtraction signal in terms of A minus B when that is the case. Similarly, the output 24 provides a subtraction signal of B minus A, when that is the case. Thus, when frequency A is greater than frequency B the subtractive answer appears in output 23. When frequency B is greater than frequency A the subtractive output appears in output 24 as B minus A.

An additional useful factor is that the fluid logic flip-flop unit 17 provides in its outputs 21 and 22, in either of said outputs, pulses representing the lower of the two frequencies, whether it be frequency A or frequency B. This frequency appears both in the flip-flop output 21 and in the flip-flop output 22. These are individual, not additive. If the lower frequency is B and it is X pulses per second then X pulses per second will appear in the output 21 and will also appear in the output 22.

In the operation of this device of FIGURE I, in order to get an output signal it is essential that two pulses of one of the trains occur consecutively without the appearance of a pulse from the other train.

In any given finite time, wherein the frequencies are regular within that time, the subtractive function will occur in accordance with whichever of the frequencies is greater. There will be an automatic flip over, change over to the reverse subtraction, whenever the frequencies change so that what was previously the greater now becomes the lesser.

Accordingly, in the operation of the device of FIGURE I, assuming that two pulses occur in sequence in the system 10, without the occurrence of one of the pulses in system 11, this indicates that the frequency in the system 10 is greater than that in the system 11. In the action of the first pulse to come through in a series, since it is the first pulse, the flip-flop unit 17 has been reset the other way so that its output is from the passage 21. Thus the first pulse in the system 15 will operate, through the control input 18, to actuate the flip-flop and change over the output from passage 21 to 22.

The first pulse coming in to the passage 15 bypasses the branch output passage 23 because it is a passage to a sink pressure. This pressure is higher than the low pressure at 18 which occurs when the output is in the passage 21 prior to the arrival of the first pulse. Therefore the first pulse actuates the flip-flop unit 17. With the output now in the passage 22, by the nature of the flip-flop device, the pressure at the control entrance of the passage 18 is high, and higher than the output sink pressure of the branch 23. This being the case, when the second pulse comes along it encounters the relatively high pressure in the input portion 18 back through the input pipe, in such manner that the second pulse is now diverted to the lower pressure area, that is, to the output through pipe 23. These output pressures may be achieved in any suitable manner (not shown). In some instances atmospheric pressure would be suitable.

Accordingly, in any such two consecutive uninterrupted pulse series, the first pulse will operate the flip-flop unit, and the second pulse will exit through the branch passage 23 as an output signal.

In such a situation where two of the A pulses go by and set up an output signal in the passage 23, and are followed by a single pulse in the B system; note that the output in the passage 23 will read 1, or A minus B, which is 2 minus 1. Note also that in the flip-flop output in this 2 and 1 situation, the flip-flop unit will have a 1 output in the passage 23 will the read 1, or A minus B, passage 21, that is to say, each of these passages by themselves, contain the lower frequency.

The sink pressure in the outputs from the branch passage 23 is thus a pressure between the low pressure created at one side of the flip-flop control and the high pressure created at the other side of the same control.

If the pulse train in the system 11 is of the frequency greater than that of the system 10, that is, B is greater than A, then the opposite will occur. Of two pulses in sequence in the system 11, the first will operate the flip-flop to place its output in the output 21. This pulse passes up the branch passage 24 because of its higher pressure, since the output of the flip-flop is then through passage 22, making the pressure low at 19.

The second consecutive pulse in the system 11 will meet with the high pressure 19 which occurs after the flip-flop has been activated to put the output of the signal in the output 21. This second pulse will be diverted into the output passage 24 to a sink pressure which is selected between the low and high pressure established at the flip-flop control unit.

This action follows from the flip-flop control unit action when there is a signal, for example at 19 and the output from the flip-flop is at 21, from the nature of the device there is a relatively high pressure at the input 19 and relatively low pressure at the input 18.

This system can thus be used to effect a control function since the frequency A may be set up as a set point, and the frequency B as a measurement value. The error signal will be either A minus B or B minus A.

The FIGURE II showing is simply an illustration of a unit 25 which is the subtractor of this device, with two input pulse trains A and B and two output signals which represent either A minus B or B minus A. There is an output there-between representing the output of the flip-flop unit. This branches to two outputs, either one of which registers the lower of the two frequencies.

The anti-coincidence system of FIGURE III is part of this invention in combination and is described as follows:

In FIGURE III, the pulse train systems and the time oscillator system are illustrated as operating from left to right. One pulse train is indicated at 26, at the top of the drawing, and the other is indicated generally at 27, at the bottom of the drawing. The timing oscillator system is indicated generally at 28, between the pulse train systems 26 and 27. The pulse train system 26 has an input passage therefor at 29, an output passage at 20. This system 26 consists of a series arrangement of a differentiator 31, a flip-flop unit 32, an "and" gate 33, and a flip-flop 34. From the output 30 there is a feedback passage 35 leading back to the first flip-flop 32, through a differentiator 36.

The input differentiator 31 is provided with a power source at 37. It is generally in the form of a flip-flop unit, with the ordinary flip-flop outputs 38 and 39 used only as vents. Between the outputs 38 and 39 there is a central output 40 through which the pulse train continues into the flip-flop unit 32. The differentiator is operated by means of two curved passages 41 and 42 which are essentially uniform in shape. Both stem from the input passage 29. These passages 41 and 42 act as opposing control inputs for the differentiator 31.

By the nature of the formation of the differentiator or by a lateral starting set signal (not shown) it may be considered that the first pulse of the pulse train in the input 29 might use one or the other of the passages 41 and 42. Assuming it to be the passage 41, this first pulse would operate the differentiator to flip the output from the output vent 38 to the output vent 39. In so doing a pulse would be generated in the common output 40, representative of the controlling pulse which is operating the flip-flop device.

At this stage of the operation of the differentiator 31, by the nature of the fluid logic flip-flop, there will be a relatively high pressure at the control input of the passage 41 and a relatively low pressure at the control input of the passage 42. Because of this difference in pressure, after the first pulse arrives in the differentiator 31, there is a tendency to equalization of pressure back through the passage 41, and then forward through the passage 42. This tendency sets up a small stream in this counter-clockwise direction.

Accordingly, when the second pulse comes along in the input 29, it will encounter this counter-clockwise flow and will follow it so as to apply the second pulse to the control input 42. This action flips the output in passage 39 to the output passage 38, and in passing provides an output pulse in the common central passage 40.

The input frequency is thus duplicated in the output passage 40 of the differentiator 31. The purpose of this action is to provide a sharp pulse input to the flip-flop 32. If the input train is formed of step signals, they will be translated into pulses for the suitable operation of the flip-flop 32.

The pulse train, in the form of sharp pulses, now appears in the passage 40 and is applied to the flip-flop 32 at a control input 43. The flip-flop 32 is provided with a power source 44 and has a vented output 45 and an operating output 46.

The normal inactive situation of the flip-flop 32 is with the output in the vent passage 45. When there is a pulse in the control input 43, the flip-flop 32 has its output moved to the output passage 46 and this output continues, to provide a control input 47 to the "and" gate 33.

The "and" gate 33 has another control input 48, from the timing oscillator system 28. If there is no signal in the timing input 48 then a pulse in the input 47 will pass through the "and" gate and vent by means of passage 49. Similarly, a timing signal in the control input 48 occurring without a pulse in the input 47 will be vented to output 49.

In the event of simultaneous occurrence of signals in the "and" gate 33 both at 47 and 48, the signals will encounter each other within the "and" gate, mutually deflect each other, and exit through the "and" gate output at 50 as a signal representative of one pulse in the pulse train system 26. The signal in the output passage 50 of the "and" gate 33 is applied to the flip-flop unit 34 as a control input at 51. The flip-flop 34 has a power source at 52, a vent output 53, and an operating output 54. The flip-flop unit 34 is normally established with the output venting through passage 53. When a signal appears in the control input 51, the output is flipped over to the operating output passage 54 as an output signal for the pulse train system 26, by way of output passage 30.

Simultaneously with this action a signal is fed back through passage 35, and through differentiator 36, to a control feedback input 55 to the flip-flop 32. This action flips the signal therein back to the output vent passage 45 to reset this device and cut off the output signal of that system.

The differentiator 36 is structurally identical with the differentiator 31 in the input. It operates in the same manner, so that anything in the form of a step signal will be reduced to a pulse. A pulse will simply be transmitted as a duplicated pulse. Thus whatever controlling signals are applied to the flip-flop 32 in the feedback control input 55 are in the form of simple, short, sharp control pulses.

The pulse train system 27, shown at the bottom of the drawing, is a duplication of the system 26 described above and operates identically with respect thereto.

Thus the pulse train system 27 comprises a series arrangement of an input passage 56, a differentiator 57, a flip-flop unit 58, an "and" gate 59, and a final flip-flop unit 60, leading to an output passage 61. There is also a feedback passage 62 from the output passage 61, through a differentiator 63 to the flip-flop unit 58.

The timing oscillator system 28 comprises an input passage 64 to a timing oscillator. This is identical with and operates in the same way as the differentiator 31 of the pulse train system 26, except that the timing oscillator has no central common output, and both of its ordinary flip-flop outputs are used.

The two outputs of the timing oscillator are at 66 and

67. From the passage 66 there is a side passage 68 leading to the "and" gate 33 of the pulse train system 26, by way of the control input 48. Also from the timing oscillator output 66, there is an output passage 69 leading to the pulse train system 27, specifically the terminal flip-flop unit 60, as a control input 70. The passage 69 includes a differentiator 71 which provides a pulse output like that of the differentiator 31 in system 26, for the purpose of providing suitable operating signals for the flip-flop unit 60.

Similarly, from the timing oscillator output 67 there are lateral passages with one at 72, to the pulse train system 27, as a control input at 73, to the "and" gate 59. There is also a lateral passage at 74, through a differentiator 75, to the terminal flip-flop 34 of the pulse train system 26, by way of an input control passage at 76.

It will be seen that when the timing oscillator provides a step signal in the output 66, it simultaneously activates the pulse train system 26 "and" gate 33, and resets the pulse train system 27 flip-flop 60.

In similar fashion, an output signal in the timing oscillator passage 67, simultaneously activates the pulse train system 27 "and" gate 59, and resets the pulse train system 26 terminal flip-flop 34.

In the operation of this device, the timing oscillator is established so that it operates, for example, first in system 26, and then in system 27, in a regular, scanner-like procedure. It looks first to the system 26, to see if there are any pulses going through, or ready to go through. If so, it lets them through, meanwhile holding back pulses in system 27. The reverse is accomplished by way of a signal in the timing oscillator output 67.

If the timing oscillator is in the actuation stage with respect to the system 26, then an input pulse will proceed through the flip-flop 32 and through the "and" gate 33 because of the simultaneous appearance of signals at 47 and 48. It will then operate the flip-flop 34 to provide the output in the passage 30, and the feed-back in the passage 35 to reset the initial flip-flop 32. The result is a single output pulse in passage 30.

While this is going on, if there is a coincident pulse in the pulse train system 27 it will reach the "and" gate 59, but will not pass through, except to vent, because there will be no signal in the input passage 73.

When the timing oscillator reverses, and actuates the system 27, the signal which is waiting at the gate 49 will be allowed to pass through. Similar holding action is effective with respect to the gate 33 and the pulse train system 26, when a signal arrives there during the time when the timing oscillator is activating the system 27.

Thus in case of a pulse in one system coincident with a pulse in the other system, according to the timing of the oscillator 65, one of these pulses will be held back long enough for the other to go through.

It is preferable in this situation that the frequency of the timing oscillator be such that one cycle comprises a positive operation of the system 26 plus a positive operation of the system 27. The frequency of the pulses in either system will be not more than one such pulse to such a cycle of the timing oscillator.

With the system according to this device, none of the pulses are lost. There simply is a delay of one when there is a coincidence of two. The two pulse train systems may represent a control function such as one being a representative of a measurement, and the other of a set point. They also may be any other two suitable pulse trains for whatever similarly suitable purpose wherein anti-coincidence is desirable.

This invention thus provides a new and novel pulse frequency subtractor.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

We claim:

1. A fluid logic pulse frequency reversible subtractor device comprising a pair of fluid systems, each comprising a fluid pulse train input, a control output passage as a fluid flip-flop control means, and a branch output passage to a pressure sink as a readout means, a fluid flip-flop operable by said control outputs of said fluid systems, wherein said control outputs are oppositely disposed with respect to each other at said flip-flop, and wherein under operating conditions, said flip-flop is established in one of its two states such that one of said control outputs is at a pressure lower than said sink pressure, and the other of said control outputs is at a pressure higher than said sink pressure, said control outputs and said flip-flop thus providing means whereby a first fluid pulse, by operating said flip-flop, establishes, at the control output of the system of said first pulse, a pressure increased to a value greater than that of said sink pressure, and at the control output of the other of said systems, a pressure decreased to a value less than that of said sink pressure, whereby a second fluid pulse in said first pulse system, on encountering said increased pressure, is diverted from said first pulse control output to the branch passage of the system of said first pulse as an output signal, said systems being operatively joined by said pressure relationships in that said second pulse is so diverted only if there occurs two consecutive pulses in said first pulse system with no pulse in the other of said systems during the time of said consecutive pulse occurrences, said output signals in said branch passages comprising an arithmetic subtraction of the pulses in one of said systems from the pulses in the other of said systems with the result appearing in the readout branch of the system carrying the highest frequency of pulses.

2. A fluid logic control device comprising a pair of fluid pulse train systems wherein the frequency of the pulses in one of said systems is representative of the set point of a variable condition controller and wherein the frequency of the pulses in the other of said systems is representative of the measurement value applied to said variable condition controller, with reversible subtractor means for automatically subtracting pulses of said one train from the pulses of said other train when the greater frequency is in said other train, and for automatically shifting to subtract the pulses of said other train from the pulses of said one train, when the greater frequency is in said one train, whereby said control device produces an error signal with respect to said control point wherever said measurement value is above or below said control point, said control device being in the form of a fluid logic pulse frequency reversible subtractor comprising said pair of fluid systems, each comprising a fluid pulse train input, a control output passage as a fluid flip-flop control means, and a branch output passage to a pressure sink as a readout means, a fluid flip-flop operable by said control outputs of said fluid systems, wherein said control outputs are oppositely disposed with respect to each other at said flip-flop, and wherein under operating conditions, said flip-flop is established in one of its two states such that one of said control outputs is at a pressure lower than said sink pressure, and the other of said control outputs is at a pressure higher than said sink pressure, said control outputs and said flip-flop thus providing means whereby a first fluid pulse, by operating said flip-flop, establishes, at the control output of the system of said first pulse, a pressure increased to a value greater than that of said sink pressure, and at the control output of the other of said systems, a pressure decreased to a value less than that of said sink pressure, whereby a second fluid pulse in said first pulse system, on encountering said increased pressure, is diverted from said first pulse control output to the branch passage of the system of said first pulse as an output signal, said systems being operatively joined by said pressure relationships in that said second pulse is so diverted only if there occurs two consecutive pulses in said first pulse system with no pulse in the other of said systems during the time of said consecutive pulse occurrences, said output signals in said branch passages comprising an arithmetic subtraction of the pulses in one of said systems from the pulses in the other of said systems with the result appearing in the readout branch of the system carrying the highest frequency of pulses, and the output of either state of said flip-flop always comprising the lower of the pulse train frequencies representing the absolute error of said control device.

References Cited by the Examiner

UNITED STATES PATENTS

| | | | |
|---|---|---|---|
| 3,001,698 | 9/1961 | Warren | 235—201 |
| 3,124,160 | 3/1964 | Zilberfarb | 235—201 |

| | | | |
|---|---|---|---|
| 3,128,040 | 4/1964 | Norwood | 235—201 |
| 3,190,554 | 6/1965 | Gehring et al. | 235—201 |

OTHER REFERENCES

Grubb: "Fluid Logic Shift Register With Intermediate Stages," IBM Technical Disclosure Bulletin, volume 6, No. 1, June 1963, p. 24.

Grubb: "Fluid Logic Parity Checking," IBM Technical Disclosure Bulletin, volume 6, No. 1, June 1963, p. 27.

Mitchell: "Fluid Binary Counter," IBM Technical Disclosure Bulletin, volume 6, No. 2, July 1963, p. 27.

Gray et al.: "Fluid Amplifiers," Control Engineering, pp. 57–64, February 1964.

RICHARD B. WILKINSON, *Primary Examiner.*

LEO SMILOW, W. F. BAUER, *Assistant Examiners.*